United States Patent
Lee et al.

(10) Patent No.: US 12,360,369 B2
(45) Date of Patent: Jul. 15, 2025

(54) DISPLAY DEVICE

(71) Applicant: Samsung Display Co., LTD., Yongin-si (KR)

(72) Inventors: Ji Won Lee, Suwon-si (KR); Jae Joong Kwon, Suwon-si (KR); Young Chan Kim, Incheon (KR); Jae Ho You, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 638 days.

(21) Appl. No.: 17/577,828

(22) Filed: Jan. 18, 2022

(65) Prior Publication Data
US 2022/0229299 A1   Jul. 21, 2022

(30) Foreign Application Priority Data
Jan. 19, 2021   (KR) ........................ 10-2021-0007461

(51) Int. Cl.
 *G02B 27/01* (2006.01)
 *G02B 27/42* (2006.01)

(52) U.S. Cl.
 CPC ..... *G02B 27/0172* (2013.01); *G02B 27/4205* (2013.01); *G02B 2027/0112* (2013.01); *G02B 2027/013* (2013.01)

(58) Field of Classification Search
 CPC ....... G03B 21/00–64; G02B 2027/0105–0198; G02B 27/01–0189; G02B 30/56; G02B 27/00–648; G02B 5/00–32
 See application file for complete search history.

(56) References Cited

U.S. PATENT DOCUMENTS

| | | | |
|---|---|---|---|
| 2011/0310356 A1* | 12/2011 | Vallius | H04N 9/3161 |
| | | | 353/31 |
| 2018/0315742 A1* | 11/2018 | Zhang | H01L 25/50 |
| 2021/0055560 A1* | 2/2021 | Benítez | G02B 5/26 |
| 2021/0294119 A1* | 9/2021 | Osmanis | G02B 30/60 |
| 2021/0302744 A1* | 9/2021 | Saitoh | G02F 1/133541 |
| 2022/0050296 A1 | 2/2022 | You et al. | |

FOREIGN PATENT DOCUMENTS

| | | |
|---|---|---|
| JP | 5906692 | 4/2016 |
| JP | 6274971 | 2/2018 |
| KR | 10-0970721 | 7/2010 |
| KR | 10-2020-0001863 | 1/2020 |

* cited by examiner

*Primary Examiner* — Christopher A Lamb, II
(74) *Attorney, Agent, or Firm* — KILE PARK REED & HOUTTEMAN PLLC

(57) ABSTRACT

A display device includes an optical combiner including a first surface; a second surface disposed at a first side of the first surface; and a third surface disposed at a second side of the first surface; a diffractive optical element disposed on the first surface of the optical combiner; a first display panel disposed on the second surface of the optical combiner and displaying a first color image; and a second display panel disposed on the third surface of the optical combiner and displaying a second color image.

18 Claims, 12 Drawing Sheets

DISPLAY DEVICE

CROSS-REFERENCE TO RELATED APPLICATION(S)

This application claims priority to and benefits of Korean Patent Application No. 10-2021-0007461 under 35 U.S.C. § 119, filed on Jan. 19, 2021 in the Korean Intellectual Property Office, the entire contents of which are incorporated herein by reference.

BACKGROUND

1. Technical Field

This disclosure relates to a display device.

2. Description of the Related Art

As a technique capable of implementing virtual reality is developed, an interest in a display device related thereto is increasing. The virtual reality may be realistically provided through a three-dimensional display device that can be viewed very closely by a user, such as a head mounted display (HMD) or a face mounted display (FMD). Since the display device is provided in front of a user's eyes, in case that the display device has low resolution, a screen door effect in which lines are visible between pixels may occur. This is a phenomenon in which a black matrix between pixels is enlarged and viewed through a lens of the display device, and may decrease as the resolution of the display device increases.

In a display device having a size that can be worn by a user on his/her head or face, it may be difficult or limited in a process to implement high resolution.

The above information disclosed in this background section is only for enhancement of understanding of the background, and therefore, it may contain information that may not form the prior art that may already be known to a person of ordinary skill in the art.

SUMMARY

Embodiments provide a high-resolution display device.

A display device according to an embodiment may include an optical combiner including a first surface; a second surface disposed at a first side of the first surface; and a third surface disposed at a second side of the first surface; a diffractive optical element disposed on the first surface of the optical combiner; a first display panel disposed on the second surface of the optical combiner and displaying a first color image; and a second display panel disposed on the third surface of the optical combiner and displaying a second color image.

The diffractive optical element may cause light providing the first color image and light providing the second color image to travel in a direction perpendicular to the first surface of the optical combiner.

A display screen of the first display panel may be parallel to the second surface of the optical combiner, and a display screen of the second display panel may be parallel to the third surface of the optical combiner.

The display device may further include a lens facing the first surface of the optical combiner.

A first distance between a display screen of the first display panel and the diffractive optical element may be equal to a second distance between a display screen of the second display panel and the diffractive optical element.

A focal length of the lens may be equal to a sum of the first distance between the display screen of the first display panel and the diffractive optical element and a distance between the diffractive optical element and the lens.

The optical combiner may include a fourth surface disposed between the second surface of the optical combiner and the third surface of the optical combiner. The display device may include a third display panel disposed on the fourth surface and displaying a third color image.

The fourth surface of the optical combiner may be parallel to the first surface of the optical combiner, and a display screen of the third display panel may be parallel to the fourth surface of the optical combiner.

The diffractive optical element may cause light providing the third color image to travel in a direction perpendicular to the first surface of the optical combiner.

The optical combiner may include a fourth surface disposed between the second surface of the optical combiner and the third surface of the optical combiner. The display device may include a third display panel disposed on the fourth surface of the optical combiner and displaying a third color image.

The optical combiner may have a substantially triangular or substantially trapezoidal cross-sectional shape.

The diffractive optical element may be disposed on the first surface of the optical combiner.

The diffractive optical element may be patterned on the first surface of the optical combiner.

The display device may further include an optical film disposed between the first display panel and the second surface of the optical combiner and between the second display panel and the third surface of the optical combiner.

$$\alpha = x \cos \theta_1, \beta = x \cos \theta_2.$$

are satisfied when an angle formed by the first surface and the second surface is $\theta_1$, an angle formed by the first surface and the third surface is $\theta_2$, a width of the first color image is $\alpha$, a width of the second color image is $\beta$, and a width of the diffractive optical element is x.

A display device according to an embodiment may include an optical combiner including a first surface; a second surface disposed at a first side of the first surface; a third surface disposed at a second side of the first surface; and a fourth surface facing the first surface; a diffractive optical element disposed on the first surface of the optical combiner; a first display panel disposed on the second surface of the optical combiner and displaying a first color image; a second display panel disposed on the third surface of the optical combiner and displaying a second color image; and a third display panel disposed on the first surface of the optical combiner or the fourth surface of the optical combiner to display a third color image.

The display device may further include a lens adjacent to the first surface of the optical combiner, and the third display panel may be disposed on the fourth surface of the optical combiner.

The display device may further include a lens adjacent to the fourth surface of the optical combiner, the display panel may be disposed on the first surface of the optical combiner, and the diffractive optical element may be disposed between the display panel and the optical combiner.

The optical combiner may have a substantially trapezoidal cross-sectional shape, and the first surface of the optical combiner and the fourth surface of the optical combiner may be parallel to each other.

$$\alpha = x \cos \theta_1, \beta = x \cos \theta_2, \gamma = x.$$

are satisfied when an angle formed by the first surface and the second surface is $\theta_1$, an angle formed by the first surface and the third surface is $\theta_2$, a width of the first color image is $\alpha$, a width of the second color image is $\beta$, a width of the third color image is $\gamma$, and a width of the diffractive optical element is x.

According to the embodiments, the resolution of the display device may be increased and luminance may be improved by combining monochrome images. According to the embodiments, there are other advantageous effects that can be recognized throughout the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
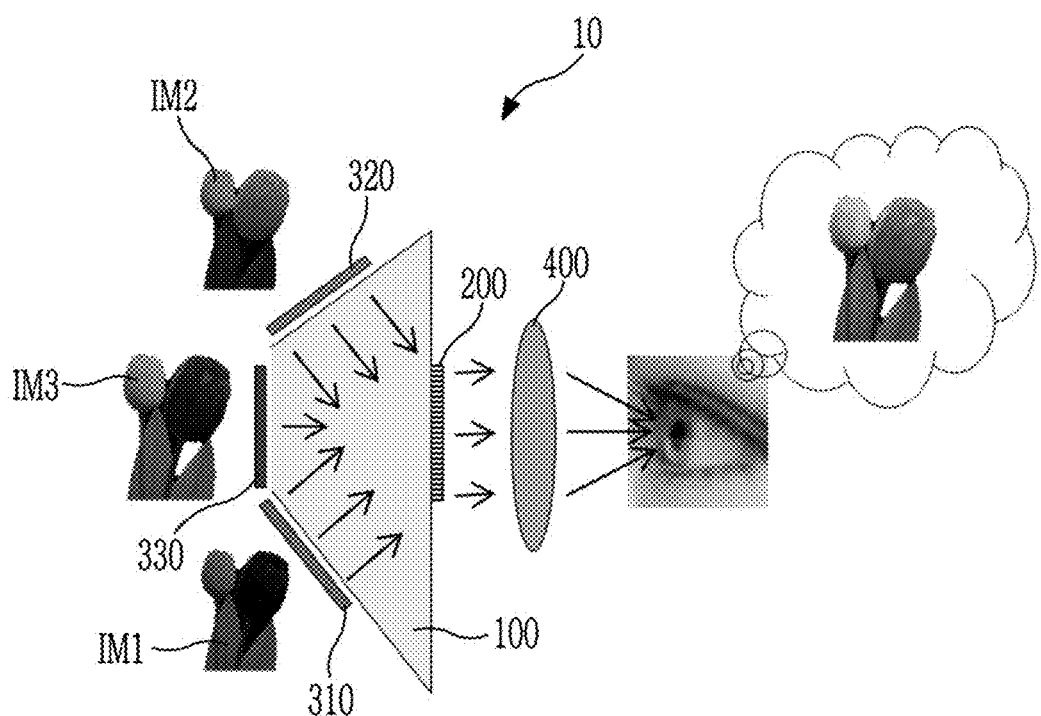
FIG. 1 illustrates a schematic structure and image superimposition of a display device according to an embodiment.

The disclosure will be described more fully hereinafter with reference to the accompanying drawings, in which embodiments are shown.

Further, sizes and thicknesses of constituent elements shown in the accompanying drawings are arbitrarily given for better understanding and ease of description.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be understood that when an element such as a layer, film, area, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising", "includes," and/or "including," "has," "have," and/or "having," and variations thereof when used in this specification, will be understood to imply the inclusion of stated elements but not the exclusion of any other elements.

In addition, in the specification, "connected" or "coupled" means that two or more components are not only directly connected or coupled, but two or more components may be connected or coupled indirectly through other components, physically connected or coupled as well as being electrically connected or coupled, or it may be referred to by different names depending on the location or function, but may include connecting or coupling each of parts that may be substantially integral to each other.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a schematic structure and image superimposition of a display device 10 according to an embodiment.

The display device 10 may include an optical combiner 100, a diffractive optical element 200, display panels 310, 320, and 330, and a lens 400.

The optical combiner 100 may provide an optical path between the display panels 310, 320, and 330 and the diffractive optical element 200. The optical combiner 100 is a medium that transfers an image that is displayed on each of the display panels 310, 320, and 330 to the diffractive optical element 200. The optical combiner 100 may be an optical element such as a prism or a lens. The optical combiner 100 may be formed of a transparent material such as glass or plastic, by way of non-limiting example. The optical combiner 100 may be entirely formed of a same material or similar material. The optical combiner 100 may have a substantially polygonal column shape (for example, a substantially triangular column or a substantially quadrangular column).

The diffractive optical element 200 may change the optical path provided by the optical combiner 100. The diffractive optical element 200 may refract, transmit, or reflect light to direct light in a direction. For example, the diffractive optical element 200 may refract light forming images displayed by the display panels 310 and 320 toward the lens 400, and may transmit light forming images displayed by the display panel 330 toward the lens 400. The diffractive optical element 200 may emit light incident at an angle to a front (in a direction toward the lens 400). The diffractive optical element 200 may be a diffraction grating. The diffractive optical element 200 may be attached or connected or coupled to the optical combiner 100, or may be patterned on a surface of the optical combiner 100.

Each of the display panels 310, 320, and 330 may be a single color display panel capable of providing an image displayed in one of primary colors. The primary colors may include red, green, and blue. The display panels 310, 320, and 330 may provide images of different colors. For example, the display panels 310, 320, and 330 include a first display panel 310 for displaying a first color image IM1, a second display panel 320 for displaying a second color image IM2, and a third display panel 330 for displaying a third color image IM3. The first display panel 310 may include only first color pixels, the second display panel 320 may include only second color pixels, and the third display panel 330 may include only third color pixels. The first color may be green, the second color may be red, and the third color may be blue, but the colors are not limited thereto. For example, the first color may be one of red, green, and blue, the second color may be one of red, green, and blue except for the first color, and the third color may be one of red, green, and blue except for the first color and second color.

There is no limitation on a type of display panels included in the display device 10. For example, the display panels 310, 320, and 330 may be emission display panels including organic or inorganic light emitting diodes. The display panels 310, 320, and 330 may be liquid crystal display panels, as an example.

The lens 400 may enlarge an image provided through the diffractive optical element 200, thereby improving a user's senses of immersion and presence. In case that an image is enlarged by the lens 400, a black matrix between pixels is also enlarged, so it may be advantageous to increase the resolution of the display device 10 in order to reduce the screen door effect in which lines are visible between pixels may occur.

Monochrome images IM1, IM2, and IM3 displayed by the respective display panels 310, 320, and 330 are combined in the diffractive optical element 200 by the optical combiner 100 to be displayed as a multicolor image. The first color image IM1 displayed by the first display panel 310, the second color image IM2 displayed by the second display panel 320, and the third color image IM3 displayed by the third display panel 330 may be directed to the diffractive optical element 200 by the optical combiner 100 and may be superimposed in the diffractive optical element 200 to provide a multicolor image. As such, in case that an image is displayed by combining the monochrome images IM1, IM2, and IM3, the resolution of the display device may be increased compared to in case that multiple colors are displayed on a single display panel. For example, the resolution of the display device may be increased by about three times compared to displaying an image by arranging all of the first, second, and third color pixels on a single display panel.

The optical combiner 100, the diffractive optical element 200, the display panels 310, 320, and 330, and the lens 400 may be fixed to an optical holder (not illustrated) to maintain their respective positions.

Figure 2:
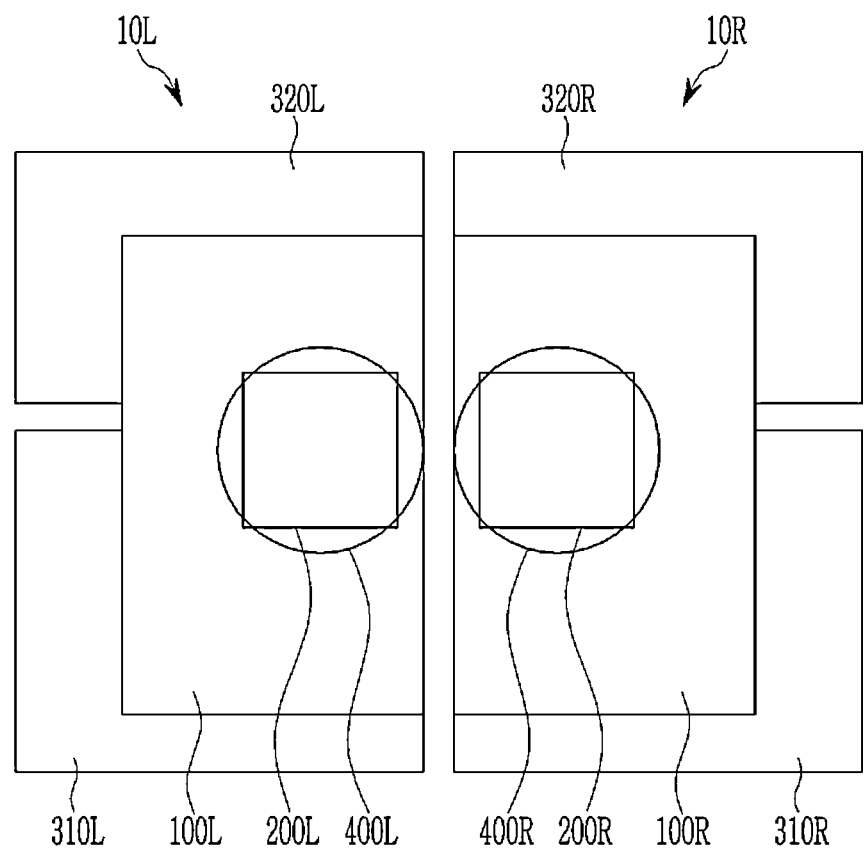
FIG. 2 illustrates a schematic front view showing a structure of a 3D image display device according to an embodiment.

FIG. 2 illustrates a schematic front view showing a structure of a 3D image display device according to an embodiment.

One of the ways to express a 3D image is a method using binocular disparity, which is a biggest factor in recognizing a 3D effect. For example, in case that different 2D images are respectively provided to a left eye and a right eye, and an image provided to the left eye (hereinafter referred to as "left eye image") and an image provided to the right eye (hereinafter referred to as "right eye image") are transferred to a brain, the left eye image and the right eye image are fused to be recognized as a 3D image with depth perception by the brain. The 3D image display device may include a left-eye display device 10L and a right-eye display device 10R that respectively provide a left-eye image and a right-eye image with parallax in order for a user to feel a 3D effect.

The left eye display device 10L may include an optical combiner 100L, a diffractive optical element 200L, display panels 310L and 320L, and a lens 400L. The right eye display device 10R may include an optical combiner 100R, a diffractive optical element 200R, display panels 310R and 320R, and a lens 400R. The left eye display device 10L and the right eye display device 10R may be fixed to a single optical holder or to separate optical holders.

In case that the left-eye display device 10L and the right-eye display device 10R each include two display panels (310L and 320L; 310R and 320R), the left-eye display device 10L and the right-eye display device 10R may each include a display panel for displaying a same color among the primary colors. For example, the display panels 310L and 320L of the left-eye display device 10L may respectively display a red image and a green image, and the display panels 310R and 320R of the right-eye display device 10R may respectively display a blue image and a green image. Even in case that the left-eye display device 10L and the right-eye display device 10R each display an image in which two monochrome images are superimposed with each other, a user may combine the left-eye image and the right-eye image to recognize the image as a multicolor image. Unlike as illustrated, the left-eye display device 10L and the right-eye display device 10R may each include three display panels that display monochrome images of different colors.

The left-eye display device 10L and the right-eye display device 10R may have differences in colors of images provided by the display panels 310L and 320L, and 310R and 320R, but they may be structurally the same. Hereinafter, the left-eye display device 10L and the right-eye display device 10R will be described as the display device 10 without being distinguished. For example, the display device 10 described herein may be a left-eye display device 10L or a right-eye display device 10R.

Figure 3:
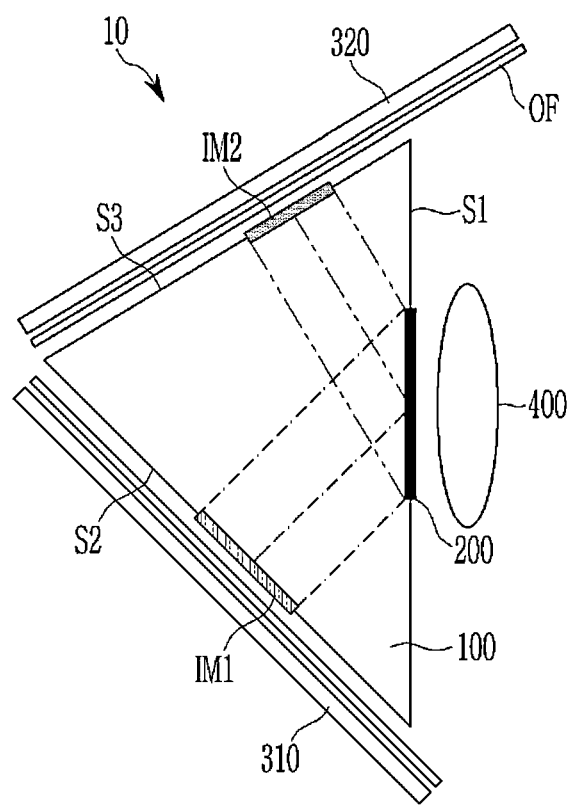
FIG. 3 illustrates a schematic side view showing a structure of a display device according to an embodiment.

FIG. 3 illustrates a schematic side view showing a structure of a display device 10 according to an embodiment. FIG. 3 illustrates an example in which one display device 10 may include two display panels 310 and 320.

The optical combiner 100 may have a substantially triangular cross-sectional shape. The optical combiner 100 may have a substantially triangular column shape. The optical combiner 100 may include a first surface S1, a second surface S2, and a third surface S3.

The diffractive optical element 200 may be provided or disposed on the first surface S1 of the optical combiner 100. The diffractive optical element 200 may be attached or disposed or coupled to the first surface S1, or may be patterned on the first surface S1. A first surface S1 may be the largest among the three surfaces S1, S2, and S3 of the optical combiner 100, but the disclosure is not limited thereto.

The first display panel 310 may be provided or disposed on the second surface S2, and the second display panel 320 may be provided or disposed on the third surface S3. A display screen of the first display panel 310 may be parallel to the second surface S2, and a display screen of the second display panel 320 may be parallel to the third surface S3. The display screen of the first display panel 310 may be spaced apart from the second surface S2 at an interval, or may be in contact with the second surface S2. The display screen of the second display panel 320 may be spaced apart from the third surface S3 at an interval, or may be in contact with the third surface S3.

Herein, the display screen represents a surface on which the images IM1 and IM2 may be displayed on each of the display panels 310 and 320, and the display screen may have a width in a horizontal direction and/or a vertical direction. A size of the display screen of the first display panel 310 may correspond to a size of the first color image IM1, and a size of the display screen of the second display panel 320 may correspond to a size of the second color image IM2. The first color image IM1 and the second color image IM2 may be respectively displayed on the display screen of the first display panel 310 and the display screen of the second display panel 320, and for convenience, they are illustrated in the second surface S2 and the third surface S3 of the optical combiner 100.

An optical film OF such as a microlens array film may be positioned or disposed between the first display panel 310 and the second surface S2 and between the second display panel 320 and the third surface S3.

The lens 400 may be positioned or disposed adjacent to the first surface S1 of the optical combiner 100. The lens 400 may be separated from the first surface S1 in consideration of a focal distance.

The first color image IM1 displayed by the first display panel 310 and the second color image IM2 displayed by the second display panel 320 may be directed to the diffractive optical element 200 by the optical combiner 100 and may be superimposed on the diffractive optical element 200. The first color image IM1 and the second color image IM2 which are superimposed may be outputted toward the lens 400 by the diffractive optical element 200, and a user may view an image in which the first color image IM1 and the second color image IM2 are superimposed through the lens 400 (for example, an image displayed by combining the first color image and the second color image).

Figure 4:
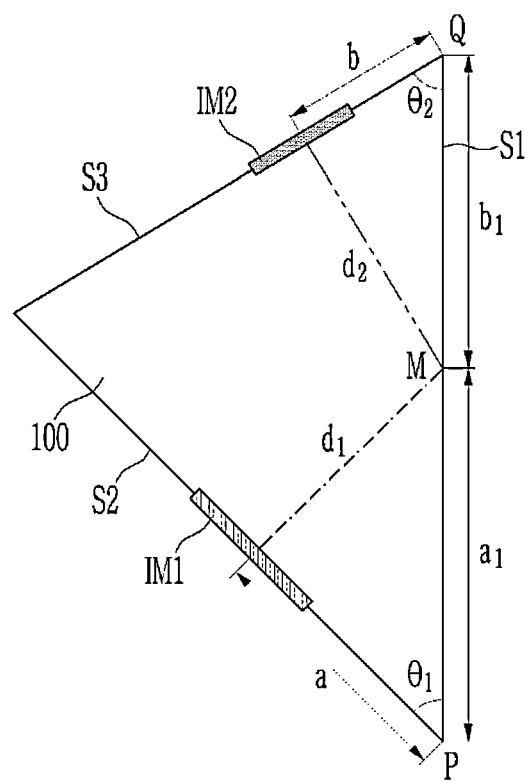
FIG. 4, FIG. 5, and FIG. 6 illustrate a design method of a display device according to an embodiment.
Figure 5:
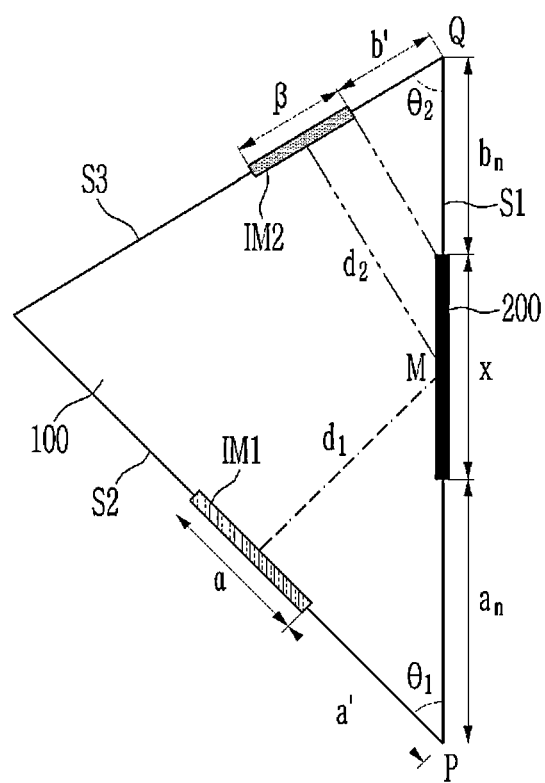
Figure 6:
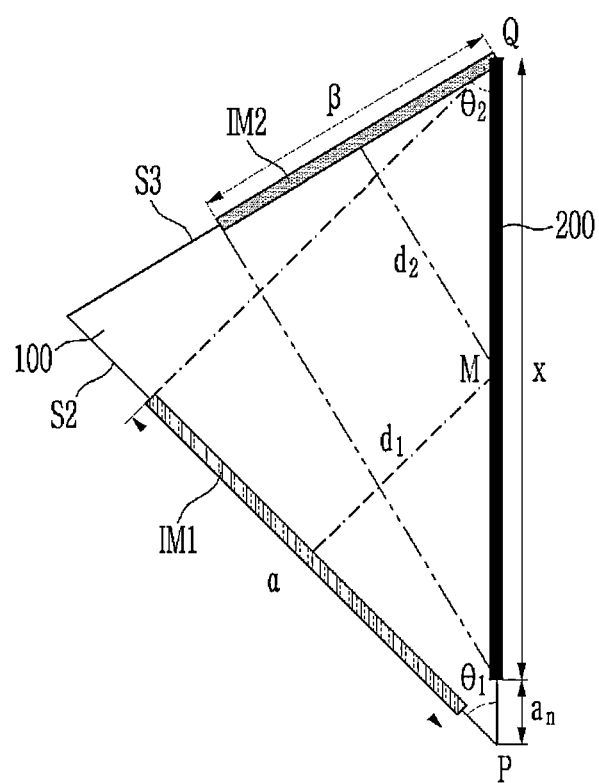

FIG. 4, FIG. 5, and FIG. 6 illustrate a design method of a display device 10 according to an embodiment.

Referring to FIG. 4 regarding a design of the optical combiner 100, a cross-section of the optical combiner 100 in the display device 10 including the two display panels 310 and 320 illustrated in FIG. 3 is illustrated. A first distance d1 between the first color image IM1 and the first surface S1 and a second distance d2 between the second color image IM2 and the first surface S1 may be the same in order to superimpose the first color image IM1 and the second color image IM2 on the first surface S1 on which the diffractive optical element 200 may be provided or disposed. Unless otherwise stated, in this specification, the distance represents the distance between centers of constituent elements.

The following equations can be established in case that a vertex where the first surface S1 and the second S2 meet is P, a vertex where the first surface S1 and the third S3 meet is Q, an intersection point of the first color image IM1 and the second color image IM2 on the first surface S1 is M, an angle formed between the first and second surfaces S1 and S2 is $\theta_1$, and an angle formed between the first and third surfaces S1 and S3 is $\theta_2$.

$$a_1 = \frac{a}{\cos\theta_1}, b_1 = \frac{b}{\cos\theta_2}$$

$$a_1 + b_1 = \frac{a}{\cos\theta_1} + \frac{b}{\cos\theta_2}$$

$$d_1 = d_2 = a\tan\theta_1 = b\tan\theta_2$$

$$a = (a_1 + b_1) \div \left(\frac{1}{\cos\theta_1} + \frac{\tan\theta_1}{\tan\theta_2 \cos\theta_2}\right)$$

$$b = (a_1 + b_1) \div \left(\frac{1}{\cos\theta_2} + \frac{\tan\theta_2}{\tan\theta_1 \cos\theta_1}\right)$$

In the above equations, $a_1$ indicates a distance between the vertex P and vertex M, $b_1$ indicates a distance between the vertex Q and the intersection point M, a indicates a distance between the first color image IM1 and the vertex P, and b indicates a distance between the second color image IM2 and the vertex Q. The intersection point M may correspond to a center of the diffractive optical element 200.

$\theta_1$ and $\theta_2$ may be changed depending on a period of a lattice, patterning, for example, in the diffractive optical element 200. Light has a different refractive index depending on a wavelength thereof, and thus $\theta_1$ and $\theta_2$ may be different. $\theta_1$ and $\theta_2$ may be determined depending on a characteristic of the diffractive optical element 200 and colors of the monochrome images IM1 and IM2 provided by the display panels 310 and 320. In case that $\theta_1$ and $\theta_2$ are determined, optimal positions of the diffractive optical element 200 and the display panels 310 and 320 on the optical combiner 100 may be determined depending on the above equations.

For example, in case that $\theta_1$ and $\theta_2$ are determined as about 45° and about 59.67°, a may be about 30.80 mm, b may be about 18.01 mm, $a_1$ may be about 43.55 mm, and $b_1$ may be about 35.68 mm. In case that the first color image IM1 is a green image and the second color image IM2 is a red image, $\theta_2$ may be greater or smaller than $\theta_1$. Each value of $\theta_1$ and $\theta_2$ and a large-small relationship therebetween may depend on the characteristic of the diffractive optical element 200.

A method of designing a size of each of the display panels 310 and 320, more precisely, a size of the display screen of each of the display panels 310 and 320, will be described with reference to FIG. 5.

The following equations can be established in case that a width of the first color image IM1 corresponding to the width of the display screen of the first display panel 310 is α, a width of the second color image IM2 corresponding to the width of the display screen of the second display panel 320 is β, and a width of the diffractive optical element 200 is x.

$$a' = a_n \cos\theta_1, \ b' = b_n \cos\theta_2$$

$$\alpha = x \cos\theta_1, \ \beta = x \cos\theta_2$$

$$0 < \beta < 2b$$

In the above equations, a' indicates a distance between the first color image IM1 and the vertex P, b' indicates a distance between the second color image IM2 and the vertex Q, $a_n$ indicates a distance between the diffractive optical element 200 and the vertex P, and $b_n$ indicates a distance between the diffractive optical element 200 and the vertex Q.

For example, in case that x is about 20 mm, $\theta_1$ is about 45°, and $\theta_2$ is about 59.67°, α is about 14.14 mm, and β is about 10.09 mm. As such, the width of the display screen of each of the display panels 310 and 320 may depend on the two angles $\theta_1$ and $\theta_2$ of the optical combiner 100 and a width x of the diffractive optical element 200. The width x of the diffractive optical element 200 may correspond to or substantially correspond to the width of an image area provided by the diffractive optical element 200.

Referring to FIG. 6, in case that $b_n$ is 0 in case that $\theta_2$ is greater than $\theta_1$, it is possible to minimize the size of the optical combiner 100. A reason that $a_n$ is greater than 0 is because the first distance d1 between the first color image IM1 and the diffractive optical element 200 and the second distance d2 between the second color image IM2 and the diffractive optical element 200 are the same. In contrast, in case that $\theta_1$ is greater than $\theta_2$, it is possible to minimize the size of the combiner 100 by designing $a_n$ as 0.

Respective distances from the display panels 310 and 320 to the lens 400 and the focal length of the lens 400 may be designed to be the same in order to increase image sharpness. As a result, the focal length of the lens 400=the first distance d1 between the first color image IM1 and the diffractive optical element 200+the distance between the diffractive optical element 200 and the lens 400=the second distance d2 between the second color image IM2 and the diffractive optical element 200+the distance between the diffractive optical element 200 and the lens 400. Herein, the first distance d1 may correspond to a distance between the display screen of the first display panel 310 and the diffractive optical element 200, and the second distance d2 may correspond to a distance between the display screen of the second display panel 320 and the diffractive optical element 200.

Figure 7:
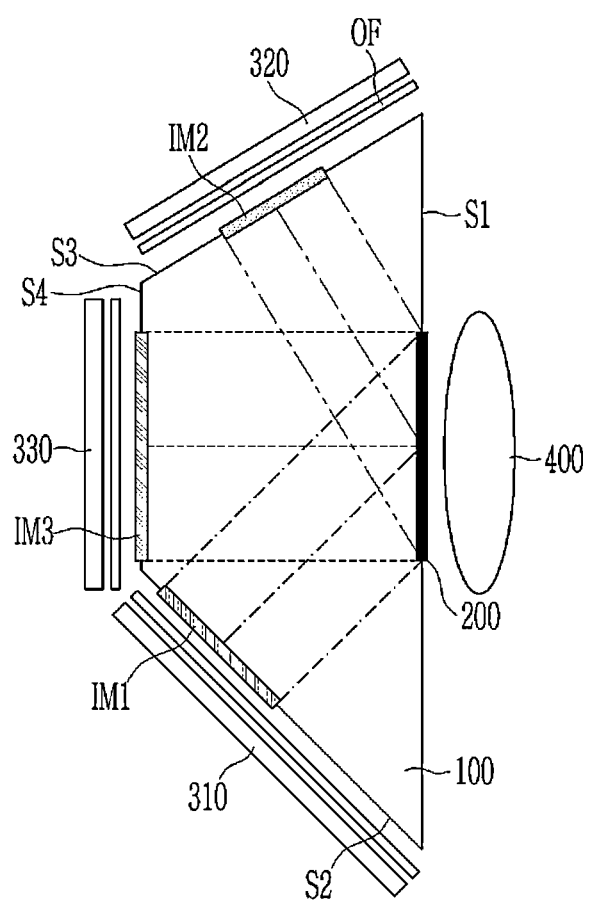
FIG. 7 and FIG. 8 each illustrate a schematic side view showing a structure of a display device according to an embodiment.
Figure 8:
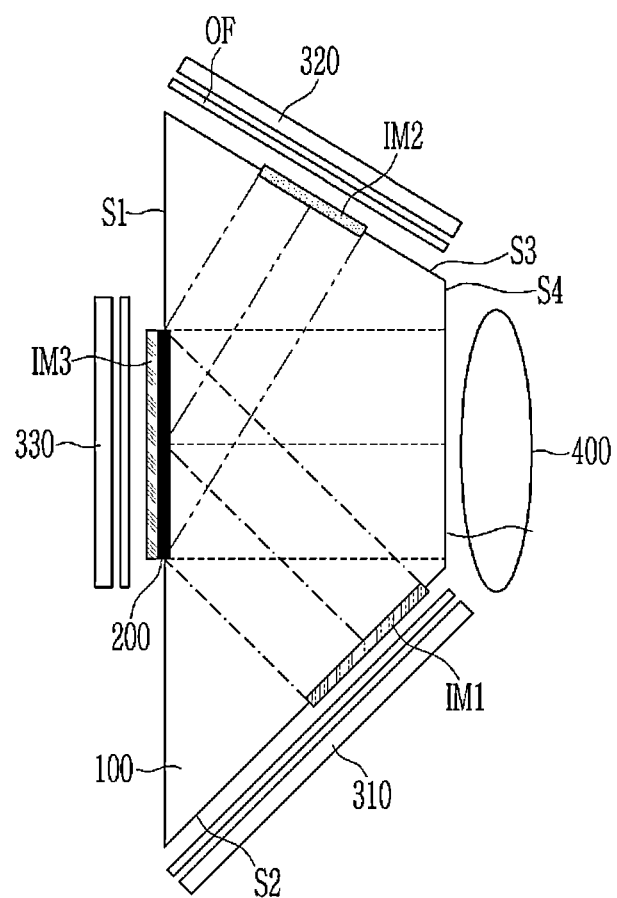

FIG. 7 and FIG. 8 each illustrate a schematic side view showing a structure of a display device according to an embodiment. FIG. 7 and FIG. 8 illustrate an example in which one display device 10 may include three display panels 310, 320, and 330.

Referring to FIG. 7, the optical combiner 100 may have a substantially trapezoidal cross-sectional shape. The optical combiner 100 may have a substantially quadrangular column shape. The optical combiner 100 may include a first surface S1, a second S2, a third surface S3, and a fourth surface S4. The first and fourth surfaces S1 and S4 may face each other, and may be parallel. The first surface S1 may be largest among the four surfaces S1, S2, S3, and S4 of the optical combiner 100, but the disclosure is not limited thereto.

The diffractive optical element 200 may be provided or disposed on the first surface S1 of the optical combiner 100. The diffractive optical element 200 may be attached or disposed or coupled to the first surface S1, or may be patterned on the first surface S1.

The first display panel 310 may be provided or disposed on the second surface S2, the second display panel 320 may be provided or disposed on the third surface S3, and the third display panel 330 may be provided or disposed on the fourth surface S4. The display screen of the first display panel 310 may be parallel to the second surface S2, the display screen of the second display panel 320 may be parallel to the third surface S3, and the display screen of the third display panel 330 may be parallel to the fourth surface S4. The display screen of the first display panel 310 may be spaced apart from the second surface S2 at an interval, or may be in contact with the second surface S2. The display screen of the second display panel 320 may be spaced apart from the third surface S3 at an interval, or may be in contact with the third surface S3. The display screen of the third display panel 330 may be spaced apart from the fourth surface S4 at an interval, or may be in contact with the fourth surface S4. An optical film OF such as a microlens array film may be positioned or disposed between the first display panel 310 and the second surface S2, between the second display panel 320 and the third surface S3, and between the third display panel 330 and the fourth surface S4.

The lens 400 may be positioned or disposed adjacent to the first surface of the optical combiner 100 and the diffractive optical element 200. The lens 400 may be separated from the first surface S1 in consideration of a focal distance.

The first color image IM1 displayed by the first display panel 310, the second color image IM2 displayed by the second display panel 320, and the third color image IM3 displayed by the third display panel 330 may be directed to the diffractive optical element 200 by the optical combiner 100, and may be superimposed in the diffractive optical element 200. The diffractive optical element 200 may refract the first color image IM1 and the second color image IM2 and may transmit the third color image IM3. The first color image IM1, the second color image IM2, and the third color image IM3, which are superimposed, may be outputted toward the lens 400 by the diffractive optical element 200, and a user may view an image in which the first color image IM1, the second color image IM2, and the third color image IM3 are superimposed through the lens 400.

The display device 10 illustrated in FIG. 8 may have a structure in which the optical combiner 100 is inverted in the display device 10 illustrated in FIG. 7. In case that a difference from the display device 10 illustrated in FIG. 7 is described, the diffractive optical element 200 may be provided or disposed on the first surface S1 of the optical combiner 100, and the third display panel 330 may also be provided or disposed on the first surface S1. The diffractive optical element 200 may be positioned or disposed between the third display panel 330 and the optical combiner 100. The lens 400 may be positioned or disposed adjacent to the fourth surface S4.

The first color image IM1 and the second color image IM2 may be directed to the diffractive optical element 200 by the optical combiner 100, and the first color image IM1, the second color image IM2, and the third color image IM3 may be superimposed in the diffractive optical element 200. The diffractive optical element 200 may reflect the first color image IM1 and the second color image IM2 at an angle (for example, in a direction that is perpendicular or substantially perpendicular to the first surface S1), and may transmit the third color image IM3. The first color image IM1, the second color image IM2, and the third color image IM3, which are superimposed, may be directed toward the lens 400 by the diffractive optical element 200, and a user may view an image in which the first color image IM1, the second color image IM2, and the third color image IM3 are superimposed through the lens 400.

Figure 9:
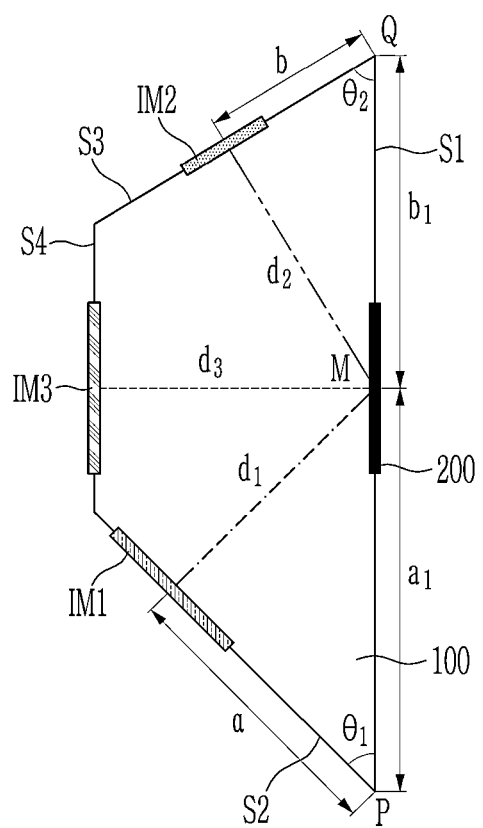
FIG. 9 and FIG. 10 illustrate a design method of a display device according to an embodiment.
Figure 10:
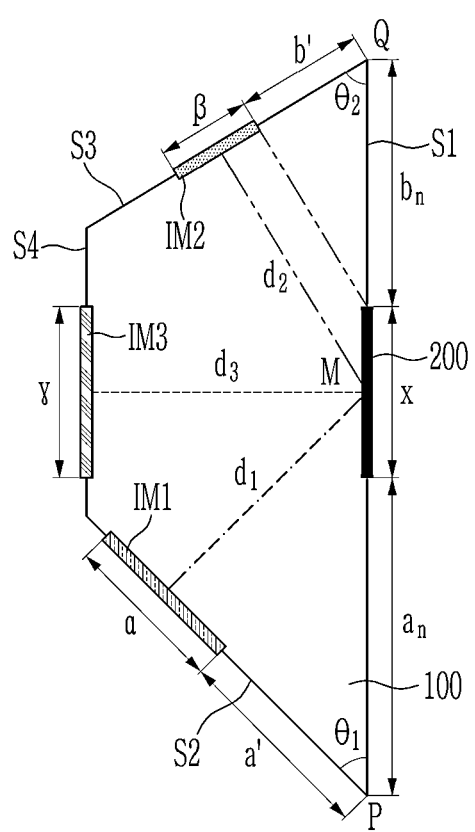

FIG. 9 and FIG. 10 illustrate a design method of a display device 10 according to an embodiment.

Referring to FIG. 9 regarding a design of the optical combiner 100, a cross-section of the optical combiner 100 in the display device 10 including the three display panels 310, 320, and 330 illustrated in FIG. 7 is illustrated. A first distance d1 between the first color image IM1 and the first surface S1, a second distance d2 between the second color image IM2 and the first surface S1, and a third distance d3 between the third color image IM3 and the first surface S1 may be the same in order to superimpose the first color image IM1, the second color image IM2, and the third color image IM3 on the first surface S1 on which the diffractive optical element 200 is provided.

Similar to the design of the optical combiner 100 in the display device 10 including the two display panels 310 and 320, the following equations can be satisfied in case that a vertex where the first surface S1 and the second S2 meet is P, a vertex where the first surface S1 and the third S3 meet is Q, an intersection point of the first color image IM1 and the second color image IM2 on the first surface S1 is M, an angle formed between the first and second surfaces S1 and S2 is $\theta_1$, and an angle formed between the first and third surfaces S1 and S3 is $\theta_2$.

$$a_1 = \frac{a}{\cos\theta_1}, b_1 = \frac{b}{\cos\theta_2}$$

$$a_1 + b_1 = \frac{a}{\cos\theta_1} + \frac{b}{\cos\theta_2}$$

$$d_1 = d_2 = d_3 = a\tan\theta_1 = b\tan\theta_2$$

$$a = (a_1 + b_1) \div \left(\frac{1}{\cos\theta_1} + \frac{\tan\theta_1}{\tan\theta_2 \cos\theta_2}\right)$$

$$b = (a_1 + b_1) \div \left(\frac{1}{\cos\theta_2} + \frac{\tan\theta_2}{\tan\theta_1 \cos\theta_1}\right)$$

$\theta_1$ and $\theta_2$ may be changed depending on a period of a lattice, patterning, by way of example in the diffractive optical element 200. Light has a different refractive index depending on a wavelength thereof, and thus $\theta_1$ and $\theta_2$ may be different. $\theta_1$ and $\theta_2$ may be determined depending on a characteristic of the diffractive optical element 200 and colors of the monochrome images IM1 and IM2 provided by the first and second display panels 310 and 320. In case that $\theta_1$ and $\theta_2$ are determined, optimal positions of the diffractive optical element 200 and the first and second display panels 310 and 320 on the optical combiner 100 may be determined depending on the above equations. A position of the third display panel 330 may be optimized by enabling the third distance d3 to be equal to the first distance d1 and the second distance d2.

A method of designing a size of each of the display panels 310, 320, and 330, more precisely, a size of the display screen of each of the display panels 310, 320, and 330, will be described with reference to FIG. 10.

The following equations can be established in case that a width of the first color image IM1 corresponding to the width of the first display screen of the first display panel 310 is α, a width of the second color image IM2 corresponding to the width of the second display screen of the second display panel 320 is β, and a width of the diffractive optical element 200 is x.

$$a' = a_n \cos\theta_1, b' = b_n \cos\theta_2$$

$$\alpha = x \cos\theta_1, \beta = x \cos\theta_2$$

$$0 < \beta < 2b$$

The widths of the display screens of the first and second display panels 310 and 320 may depend on the two angles θ1 and θ2 of the optical combiner 100 and the width x of the diffractive optical element 200. Since the third display panel 330 is parallel to the diffractive optical element 200, a width γ of the display screen of the third display panel 330 may be the same as the width x of the diffractive optical element 200. The width x of the diffractive optical element 200 corresponds to the width of an image area provided by the diffractive optical element 200.

Respective distances from the display panels 310, 320, and 330 to the lens 400 and the focal length of the lens 400 may be designed to be the same in order to increase image sharpness. As a result, the focal length of the lens 400=the first distance d1 between the first color image IM1 and the diffractive optical element 200+the distance between the diffractive optical element 200 and the lens 400=the second distance d2 between the second color image IM2 and the diffractive optical element 200+the distance between the diffractive optical element 200 and the lens 400=the third distance d3 between the third color image IM3 and the diffractive optical element 200+the distance between the diffractive optical element 200 and the lens 400. Herein, the first distance d1 may correspond to a distance between the display screen of the first display panel 310 and the diffractive optical element 200, the second distance d2 may correspond to a distance between the display screen of the second display panel 320 and the diffractive optical element 200, and the third distance d3 may correspond to a distance between the display screen of the third display panel 330 and the diffractive optical element 200.

Figure 11:
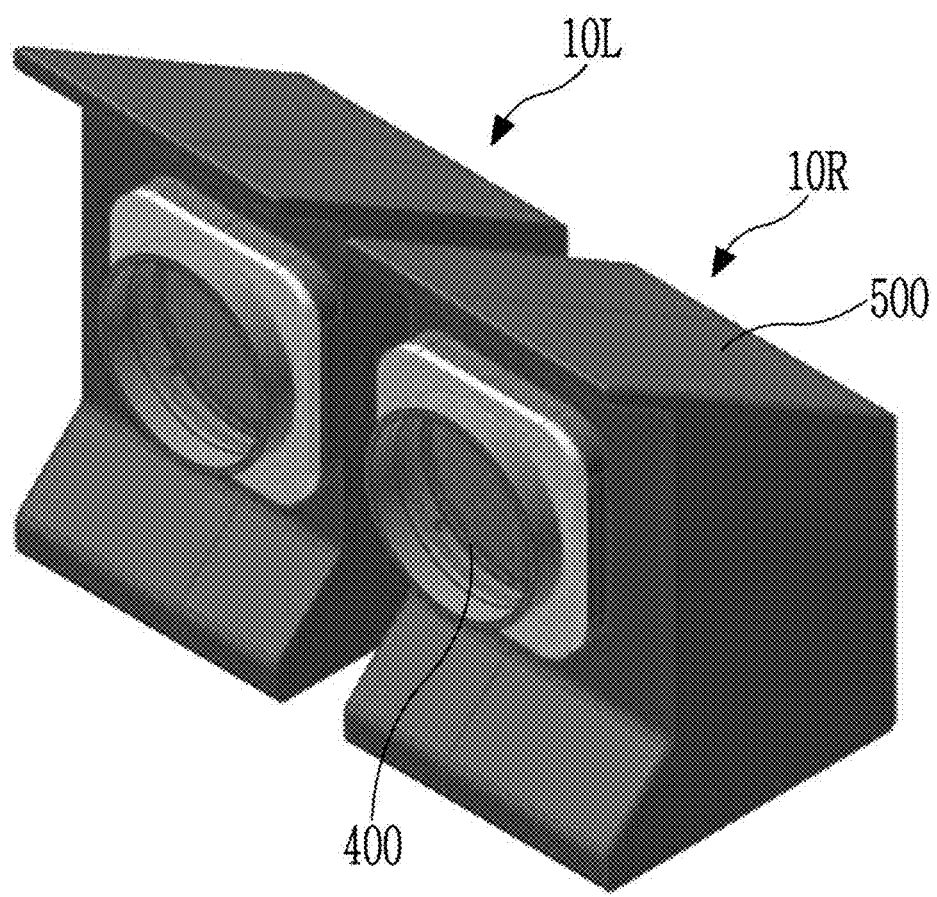
FIG. 11 and FIG. 12 illustrate a 3D image display device according to an embodiment.
Figure 12:
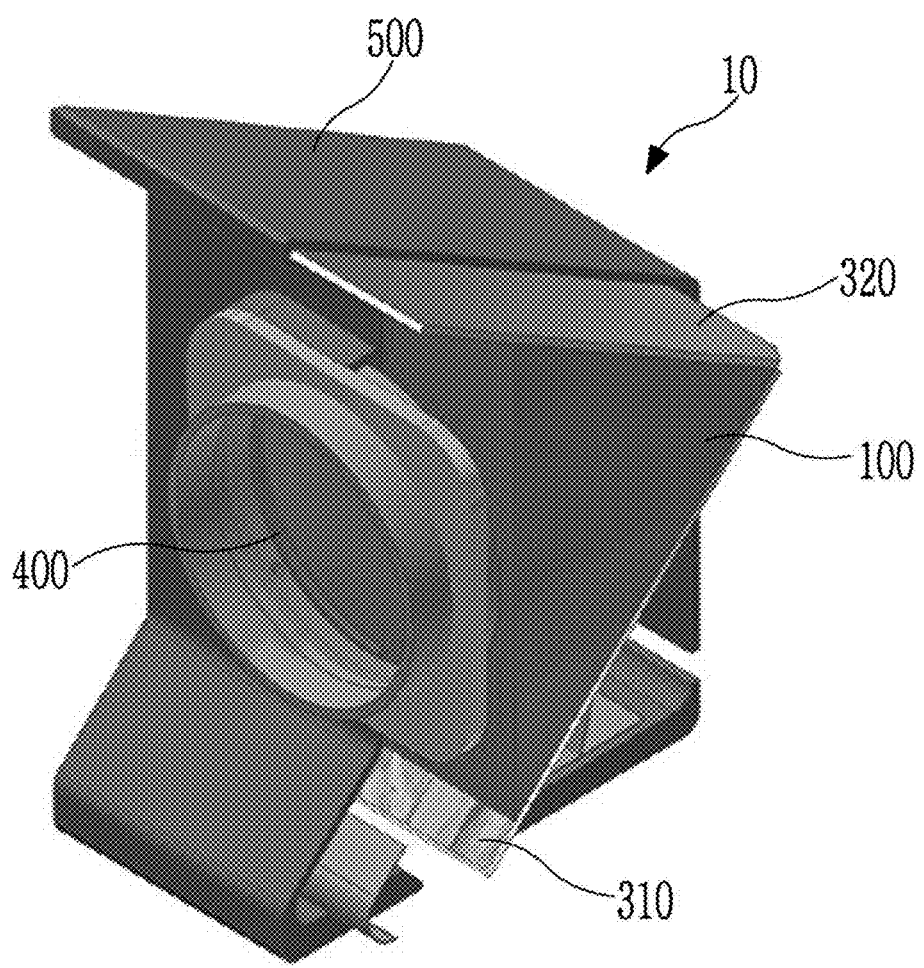

FIG. 11 and FIG. 12 illustrate a 3D image display device according to an embodiment.

FIG. 11 generally illustrates the 3D image display device, and FIG. 12 illustrates an internal structure of the display device 10 by removing a portion of a holder 500.

Referring to FIG. 11, the 3D image display device may include a left-eye display device 10L and a right-eye display device 10R, which may form a pair. The left-eye display device 10L and the right-eye display device 10R may be separate or integral with each other.

Referring to FIG. 12, the display device 10 may include a holder 500, an optical combiner 100 accommodated therein, a diffractive optical element 200, display panels 310 and 320, and a lens 400L. The diffractive optical element 200 may be provided or disposed on a long side of the optical combiner 100. The display panels 310 and 320 may be vertically positioned as illustrated, but may be horizontally or diagonally positioned. Monochrome images displayed by the display panels 310 and 320 may be superimposed through the optical combiner 100 and the diffractive optical element 200 to be displayed as a multicolor image, and may be finally provided to a user through the lens 400.

While the disclosure has been described in connection with what is considered to be practical embodiments, it is to be understood that the disclosure is not limited to the disclosed embodiments, but, on the contrary, is intended to cover various modifications and equivalent arrangements included within the spirit and scope of the disclosure and the appended claims.

What is claimed is:

1. A display device comprising:
an optical combiner including:
a first surface;
a second surface disposed at a first side of the first surface; and
a third surface disposed at a second side of the first surface;
a diffractive optical element disposed on the first surface of the optical combiner;
a first display panel disposed on the second surface of the optical combiner and at an acute angle relative to the first surface and displaying a first color image; and
a second display panel disposed on the third surface of the optical combiner and at an acute angle relative to the first surface and displaying a second color image, wherein $\alpha = x \cos \theta_1$, $\beta = x \cos \theta_2$, are satisfied when an angle formed by the first surface and the second surface is $\theta_1$, an angle formed by the first surface and the third surface is $\theta_2$, a width of the first color image is $\alpha$, a width of the second color image is $\beta$, and a width of the diffractive optical element is x.

2. The display device of claim 1, wherein the diffractive optical element causes light providing the first color image and light providing the second color image to travel in a direction perpendicular to the first surface of the optical combiner.

3. The display device of claim 1, wherein
a display screen of the first display panel is parallel to the second surface of the optical combiner, and
a display screen of the second display panel is parallel to the third surface of the optical combiner.

4. The display device of claim 1, further comprising:
a lens facing the first surface of the optical combiner.

5. The display device of claim 4, wherein a first distance between a display screen of the first display panel and the diffractive optical element is equal to a second distance between a display screen of the second display panel and the diffractive optical element.

6. The display device of claim 5, wherein a focal length of the lens is equal to a sum of the first distance between the display screen of the first display panel and the diffractive optical element and a distance between the diffractive optical element and the lens.

7. The display device of claim 1, wherein
the optical combiner includes a fourth surface disposed between the second surface of the optical combiner and the third surface of the optical combiner, and
the display device includes a third display panel disposed on the fourth surface and displaying a third color image.

8. The display device of claim 7, wherein
the fourth surface of the optical combiner is parallel to the first surface of the optical combiner, and
a display screen of the third display panel is parallel to the fourth surface of the optical combiner.

9. The display device of claim 7, wherein the diffractive optical element causes light providing the third color image to travel in a direction perpendicular to the first surface of the optical combiner.

10. The display device of claim 1, wherein
the optical combiner includes a fourth surface disposed between the second surface of the optical combiner and the third surface of the optical combiner, and
the display device includes a third display panel disposed on the first surface of the optical combiner and displaying a third color image.

11. The display device of claim 1, wherein the optical combiner has a substantially triangular or substantially trapezoidal cross-sectional shape.

12. The display device of claim 1, wherein the diffractive optical element is disposed on the first surface of the optical combiner.

13. The display device of claim 1, wherein the diffractive optical element is patterned on the first surface of the optical combiner.

14. The display device of claim 1, further comprising:
an optical film disposed between the first display panel and the second surface of the optical combiner and between the second display panel and the third surface of the optical combiner.

15. A display device comprising:
an optical combiner including:
a first surface;
a second surface disposed at a first side of the first surface;
a third surface disposed at a second side of the first surface; and
a fourth surface facing the first surface;
a diffractive optical element disposed on the first surface of the optical combiner;
a first display panel disposed on the second surface of the optical combiner and at an acute angle relative to the first surface and displaying a first color image;
a second display panel disposed on the third surface of the optical combiner and at an acute angle relative to the first surface and displaying a second color image; and a third display panel disposed on the first surface of the optical combiner or the fourth surface of the optical combiner and displaying a third color image, wherein $$\alpha = x\cos\theta_1, \beta = x\cos\theta_2,$$

are satisfied when an angle formed by the first surface and the second surface is $\theta_1$, an angle formed by the first surface and the third surface is $\theta_2$, a width of the first color image is $\alpha$, a width of the second color image is $\beta$, and a width of the diffractive optical element is x.

16. The display device of claim 15, further comprising:
a lens adjacent to the first surface of the optical combiner, wherein the third display panel is disposed on the fourth surface of the optical combiner.

17. The display device of claim 15, further comprising:
a lens adjacent to the fourth surface of the optical combiner, wherein
the third display panel is disposed on the first surface of the optical combiner, and
the diffractive optical element is disposed between the display panel and the optical combiner.

18. The display device of claim 15, wherein
the optical combiner has a substantially trapezoidal cross-sectional shape, and
the first surface of the optical combiner and the fourth surface of the optical combiner are parallel to each other.

* * * * *